United States Patent
Lamb

(10) Patent No.: US 6,179,901 B1
(45) Date of Patent: Jan. 30, 2001

(54) APPARATUS AND METHOD FOR PRODUCING HF FROM PHOSPHATE ROCK

(76) Inventor: Louis J. Lamb, 2840 Land O'Lakes Blvd., Land O Lakes, FL (US) 34639

( * ) Notice: Under 35 U.S.C. 154(b), the term of this patent shall be extended for 0 days.

(21) Appl. No.: 09/332,085

(22) Filed: Jun. 14, 1999

(51) Int. Cl.[7] .................................................. B01D 53/14
(52) U.S. Cl. ................................ 95/187; 95/199; 95/223; 95/229; 95/233; 96/234; 96/247; 96/265; 423/240 R; 423/488
(58) Field of Search .......................... 95/233, 223, 228, 95/229, 199, 187; 423/240 R, 483, 488; 96/234, 244, 247, 250, 265

(56) References Cited

U.S. PATENT DOCUMENTS

| | | | |
|---|---|---|---|
| 2,591,096 | * | 4/1952 | Penick ..................................... 95/233 |
| 2,690,815 | * | 10/1954 | Calfee et al. ........................... 95/233 |
| 3,219,410 | * | 11/1965 | Dexter et al. ..................... 423/240 R |
| 3,415,039 | * | 12/1968 | Rushton et al. ........................ 95/233 |
| 3,512,341 | * | 5/1970 | English ................................... 95/233 |
| 3,642,438 | * | 2/1972 | Hartig .............................. 423/240 R |
| 3,660,019 | * | 5/1972 | Predikant et al. ............... 423/240 R |
| 3,725,536 | * | 4/1973 | Gentilli ................................... 95/233 |
| 3,811,246 | * | 5/1974 | Erickson ................................. 95/233 |
| 3,907,522 | * | 9/1975 | Tsukamoto et al. .................... 95/233 |
| 3,919,399 | * | 11/1975 | Schabacher et al. ................... 95/233 |
| 4,042,667 | * | 8/1977 | Ishiwata et al. ................. 423/240 R |
| 4,106,918 | * | 8/1978 | Fujikawa et al. ....................... 95/233 |
| 4,152,405 | | 5/1979 | Peterson et al. . |
| 4,269,609 | * | 5/1981 | Brunold et al. ........................ 95/233 |
| 4,608,238 | | 8/1986 | Wilson, Sr. et al. . |
| 4,765,822 | * | 8/1988 | Barber .................................... 95/233 |
| 5,180,569 | | 1/1993 | Erickson et al. . |
| 5,597,545 | | 1/1997 | Chang et al. . |

FOREIGN PATENT DOCUMENTS

| | | | |
|---|---|---|---|
| 2534616 | * | 2/1977 | (DE) ..................................... 95/233 |
| 277659 | * | 4/1990 | (DE) ..................................... 95/233 |

* cited by examiner

*Primary Examiner*—Duane S. Smith
(74) *Attorney, Agent, or Firm*—David Kiewit

(57) ABSTRACT

Hydrogen fluoride production apparatus removes phosphate rock dust from a hot gas mixture exhausted from a phosphate rock defluorination kiln; cools the hot gas mixture in a heat exchanger to a low enough temperature that it can be brought into contact with acid-resistant polymeric materials without destroying them; uses a water spray scrubber for further cooling the gas and absorbing the fluoride values as HF-rich liquor; and pumps the HF liquor to a holding tank. One such plant uses a gas tube steam boiler as the heat exchange and has several series-connected scrubbers to extract the fluorine values from the kiln exhaust so that the residual gas mixture can be exhausted into the atmosphere without exceeding permissible fluorine value levels. In this arrangement water is fed into the scrubber furthest from the boiler to extract HF from the process gas, and an HF-laden process liquor is fed out of the furthest scrubber into the second furthest scrubber, where it is sprayed into the gas stream. This counter-current flow arrangement continues until one reaches the scrubber closest to the boiler and extracts the most concentrated process liquor from a sump nearest the boiler.

10 Claims, 1 Drawing Sheet

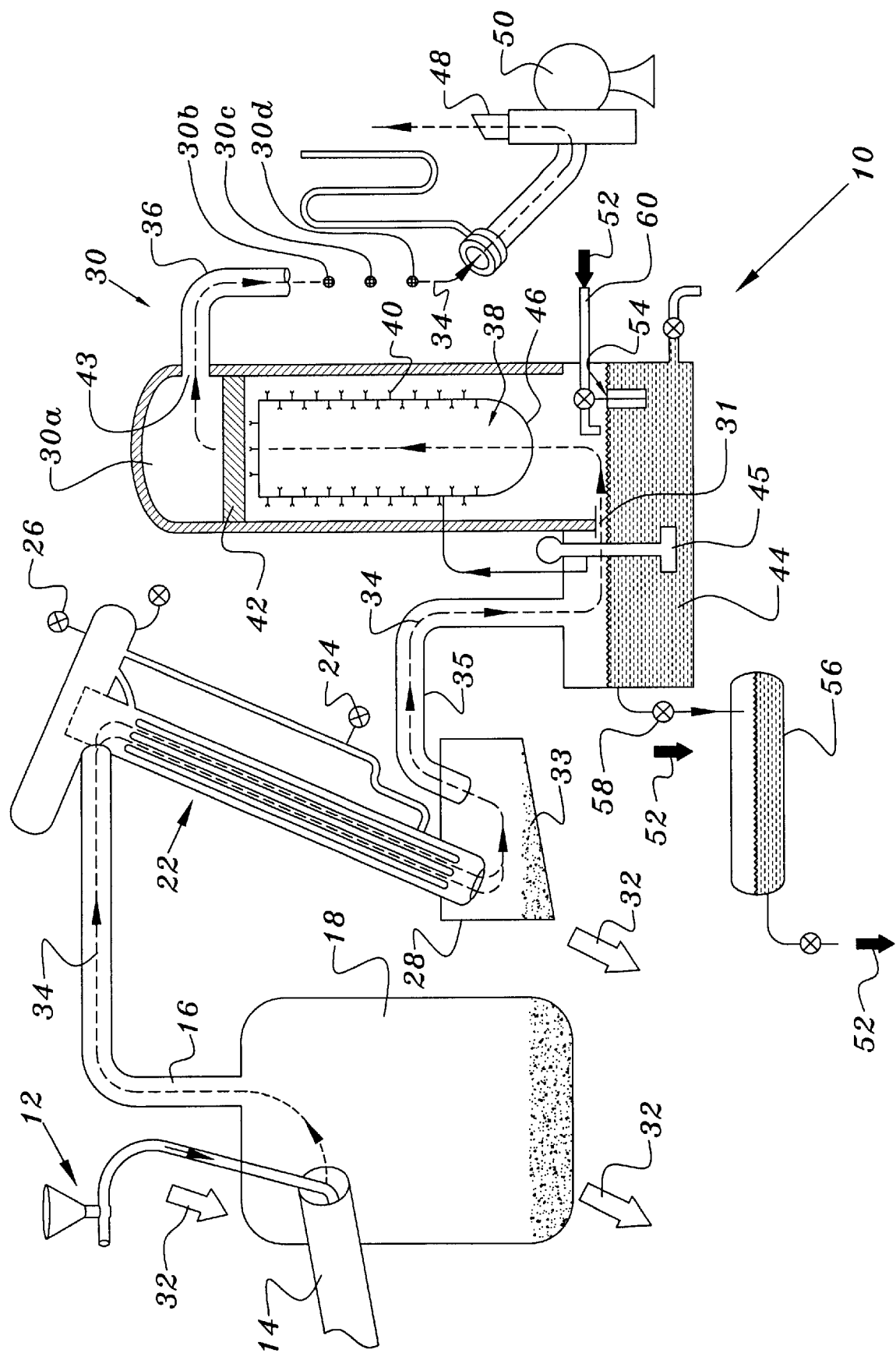

APPARATUS AND METHOD FOR PRODUCING HF FROM PHOSPHATE ROCK

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The invention relates to obtaining hydrofluoric acid as a byproduct of a process of deriving adjusted phosphorous compounds from naturally occurring phosphate rock.

2. Background Information

Mined phosphate rock is commonly defluorinated by heating the rock to an elevated temperature in a kiln or fluidized bed reactor. For simplicity of description, an exemplar kiln process will be described herein, but those skilled in the art will recognize that other defluorination processes can be used and that those processes would also deliver a fluorine-rich flue gas. In one version of the defluorination process a kiln is used that is about two hundred fifty feet long with an internal diameter of about six feet. This generally horizontal tubular kiln slopes downward from an infeed end with a slope of about three feet for each twenty feet of length. Crushed and chemically adjusted phosphate rock is fed into the kiln at the upper, low temperature, end and moves under the influence of gravity to the lower end where the temperature is commonly on the order of twenty six hundred degrees Fahrenheit. At these high temperatures the bound fluorine in the rock is liberated and the hot fluorine-rich gas flows back up the kiln and is exhausted at the upper end thereof at a temperature of about thirteen hundred degrees Fahrenheit. The exhausted gas is accompanied by a significant amount of phosphate-rich dust.

It is known in the prior art to capture and dispose of fluorine compounds contained in the hot exhausted gas mixture by conveying the gas mixture through a spray of water, collecting the liquid effluent and neutralizing the effluent liquid with limestone so as to tie the fluorine up as calcium fluoride. It is also known in the prior art to collect the effluent liquid, which is commonly less than 6% HF by weight, and recover a fraction of the fluoride values therefrom. Only about half of the available HF is recovered in these processes. The rest must be neutralized and the precipitate from the neutralization process dumped. Moreover, because the hot exhausted gas mixture contains a large amount of entrained phosphate rock dust, the product from prior art recovery processes is contaminated with phosphorous.

BRIEF SUMMARY OF THE INVENTION

A defluorination apparatus of the invention provides a means for removing phosphate rock dust from a hot gas mixture exhausted from a phosphate rock defluorination kiln; a heat exchanger for cooling the hot gas mixture to a low enough temperature that it can be brought into contact with acid-resistant polymeric materials without destroying them; a water spray scrubber for further cooling the gas and absorbing the fluoride values as HF-rich liquor, and a pumping arrangement for pumping the HF liquor to a holding tank. In a preferred arrangement the heat exchanger is a gas tube steam boiler and a plurality of series-connected scrubbers is used to extract the fluorine values from the kiln exhaust so that the residual gas mixture can be exhausted into the atmosphere without exceeding permissible fluorine value levels. In the preferred series connected set of scrubbers, water is fed into the scrubber most distal from the boiler to extract HF from the gas fed thereinto, and an HF-laden process liquor is fed out of the most distal scrubber into the second most distal scrubber, where it is sprayed into the gas stream. This counter-current flow arrangement continues until one reaches the scrubber closest to the boiler and extracts the most concentrated process liquor from a sump thereof.

The invention provides a method of recovering fluorine values from a dusty hot gas mixture exhausted from a phosphate defluorination kiln. A preferred method comprises the steps of conveying the hot gas mixture upwardly from a dust collection chamber to eliminate phosphate dust; cooling the hot gas mixture in a gas tube steam boiler to a temperature of approximately three hundred degrees Fahrenheit; passing the cooled gas mixture through a water spray to form a mist comprising droplets of a hydrofluoric acid solution; aggregating the HF-rich droplets to form an HF liquor having a concentration in the range of twelve to seventeen percent HF by weight; and pumping the HF liquor into a holding tank.

One of the features of the invention is the recovery of HF-rich liquor from a phosphate rock defluorination kiln, where the concentration of HF in the liquor can be more than three times as high as is found in prior art processes. These higher HF values are retained in the scrubbers by disposing a porous polymeric pad, having a preferred thickness of about one and one half inches, at the top of each scrubber.

Another of the features of the invention is the recovery of relatively phosphorous-free HF values from a phosphate rock defluorination kiln.

An additional feature of the invention is the recovery of waste heat from a phosphate rock defluorination kiln by means of a gas tube boiler used to cool the exhaust gas mixture to temperatures low enough that the mixture can be handled in polymer-coated vessels.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

The drawing provides an overall schematic depiction of apparatus used in the invention.

DETAILED DESCRIPTION OF THE INVENTION

A plant 10 for producing both defluorinated phosphate rock and concentrated HF liquor is schematically depicted in the drawing. Crushed phosphate rock is fed from a hopper 12 into a higher, input, end of a kiln 14 which may be some two hundred fifty feet in length and ten feet in diameter. Inasmuch as the kiln 14 is conventional and well known, only the infeed end of it is depicted in the drawing. This kiln 14 slopes downwardly from the infeed end at a rate of about three feet for each twenty feet of kiln length. The rock is heated as it travels through the kiln and reaches a maximum temperature of approximately twenty six hundred degrees Fahrenheit in the final twenty five feet or so of the kiln. At this temperature, the fluorine impurities in the rock are vaporized and passed back through the kiln 14 and upwards through a flue 16. In a preferred embodiment, the flue 16 extends upwardly by fifteen feet or more from the top of a dust collection and infeed chamber 18 into which the input phosphate rock is introduced. Much of the phosphate-rich dust is separated, by the influence of gravity, from the flue gas during its passage through the flue 16. It is noted that the preferred flue length, which is longer than is conventional, aids in this separation process. The phosphate-rich dust is then removed from the dust chamber 18, as indicated by the hollow arrow 32 (the flow of various solid materials, which is of only peripheral interest to the invention, is indicated in the drawing with hollow arrows 32).

One of the problems encountered in prior art attempts to recover fluorine values in the defluorination of phosphate rock is that the flue gas leaving the kiln is too hot to allow it to impinge on a plastic covered surface, such as one would expect to use in a scrubber. The present invention addresses this problem by providing a heat exchanger, which is preferably a gas tube boiler 22 and that is preferably generally vertically oriented or slanted somewhat away from the vertical as depicted in the drawing. In a preferred embodiment water is pumped into the lower end of the boiler 22 through a pipe 24. Heat from the process gas mixture (the flow of which is schematically depicted in the drawing with dashed arrows 34) is used to generate steam that is taken off through a steam outlet pipe 26 and used elsewhere in the phosphate production process. The process gas mixture, which is preferably cooled in the boiler to a temperature of about three hundred degrees Fahrenheit, then flows through a dust collection box 28 and into a first scrubber/concentrator 30.

It will be noted that the choice of a generally vertical orientation for the preferred boiler 22 allows dust (some of which is residual phosphate rock dust, but much of which is a phosphorous-rich sublimation dust) 33 to fall under the influence of gravity into the dust collector box 28 from where it is removed, as indicated by a hollow arrow 32. In all cases, the use of a vertically oriented flue or dust chamber outlet pipe 16 and a vertically oriented boiler 22 removes substantially all of the dust from the process gas mixture. Removing all of the dust essentially removes all of the phosphorous, which would otherwise be a contaminant in the recovered fluorine values.

The cooled and more or less particle-free process gas mixture is fed from the outlet of the dust collection box 28 through a pipe 35 to the first of a set of series-connected scrubbers 30. It may be noted that prior to onset of scrubbing the process gas mixture is dry and therefore can be handled in conventional mild steel piping. One of the scrubbers 30 is schematically depicted in some detail in the drawing as indicated by the reference character 30a. Other structurally identical units, which are connected in series with the schematically depicted scrubber 30a, are indicated in the drawing with large dots 30b, 30c, 30d.

Once water-scrubbing of the gas mixture begins the equipment used to handle the moist gas mixture and the strongly acidic process liquors must be selected from those that are not attacked by HF. The interior surfaces of the scrubbers 30 are preferably lined with an impervious polymeric material or may comprise a resin-impregnated graphite material of the type commonly sold under the trade-name Karbate® by the Karbate Division of SGL Technic, Inc. The ducts 36 that convey the partly scrubbed gases from one scrubber to another also preferably comprise at least an inner liner made of an appropriate HF-resistant polymer. The sprayers 40 and manifolds 46, which must operate in a warm corrosive gas environment, are preferably made of polyvinylidiene fluoride, which is commonly sold under the trade name of Kevlar®. Those portions of the system that handle the process liquors, which are at modest temperature, can be selected from any of a wide variety of known polymeric materials or from plastic-coated metals that are suitable for handling HF.

The gaseous mixture from which fluorine values are being recovered is introduced into the lower portion of a first scrubber 30a, e.g., through an aperture 31 that may have a height of some six inches and a width of some three feet. The aperture 31 is preferably disposed below the midline of the scrubber 30a, and flows upward through a misting portion 38 of the scrubber 30 where a portion of the fluoride vapor is absorbed by the liquid sprayed out through spray heads 40. It will be understood by those skilled in the chemical arts that the amount of HF condensed is determined from the measured gas temperature and the well-known HF liquid-vapor curve. Most of the sprayed liquid droplets fall into the sump 44, but a fraction of the sprayed liquid—i.e., the balance of the mist entrained in the gaseous mixture—is captured in a polymeric filter mat or pad 42 disposed adjacent the upper end of the scrubber and below the scrubbed gas outlet 43. The captured mist drips down into a sump 44. A pump 45, which is preferably driven by a motor located outside the scrubber, recirculates the liquor from the sump 44 through the spray manifold 46, and also feeds out enriched process liquor. The product, i.e., the enriched process liquor from the first 30a of the series of scrubbers 30, is withdrawn through a valve 58, which may be set so as to maintain a desired final HF concentration at steady state operation. In the drawing, the flow of make-up water and of process liquor having varying degrees of enrichment is depicted with heavy black arrows 52.

The use of the polymeric filter mat 42 provides a significant performance improvement over the prior art. The prior art recovery processes generally did not use a de-misting filter downstream from a water spray. Hence, in the prior art processes HF-laden mist was carried through the scrubber and thus limited the performance of a series string of scrubbers to be no better than what one could obtain with a single stage.

In order to efficiently recover HF from the flue gas, a series of scrubbers 30 is employed. The partially scrubbed process gas mixture that is exhausted through a pipe 36 (which is preferably a fiberglass-reinforced plastic pipe having an HF-resistant polymeric lining) from a first of the scrubbers 30a is passed to a second scrubber 30b for recovery of remaining fractions of the HF. In a preferred embodiment, four such scrubbers 30a, 30b, 30c, 30d are used, although it will be understood by those skilled in the art that more or fewer scrubbers could be employed in the process. The HF-depleted gas output from the last of the process scrubbers 30 is vented into the atmosphere stack 48 having an air blower 50 operatively attached thereto. In some cases the HF-depleted gas output from the last of the process scrubbers may contain a higher HF concentration than is allowed to be discharged, even though it contains too little HF to make it worthwhile adding an additional process scrubber to the chain. In these cases the HF-depleted gas can be routed through a conventional horizontal scrubber (not shown) in order to reduce the HF concentration in the exhaust gas to a permissible level.

In a preferred embodiment, make-up water or process liquor is fed into each the four scrubbers 30a–d by using an inlet valve 54, which may be a float valve employed in a known fashion to maintain the level of liquor in the sump 44 of each scrubber 30 at a substantially constant level. When fully HF-enriched liquor is withdrawn from the first scrubber 30a and sent to a holding tank 56, the liquor level falls enough in the first scrubber's sump to open a float valve 54 that allows less concentrated liquor to flow into the first scrubber 30a from the second scrubber 30b. This, in turn, drops the liquor level in the second sump enough to open its float valve and the same flow process occurs in sequentially disposed scrubbers. At the last scrubber 30d, which is expected to be most distal from the flue, fresh make-up water flows into the scrubber series through a make-up water inlet 60 whenever the process liquor is being moved from the most distal sump to the second most distal sump.

A preferred arrangement employing four scrubbers can produce an HF solution having a concentration of about 15.5% by weight, with the principal impurities being $P_2O_5$ (0.4%), $Na^+$ (0.4%) and $SO_4^=$ (0.4%). When operated to deliver this final concentration output from the first scrubber 30a, the HF concentration in the sump of the second scrubber 30b is 8.8%, in the third scrubber 30c is 3.4%, and in the fourth scrubber 30d is 0.7%. Higher concentrations of HF can be obtained if the process equipment is properly contained so that personnel operating the recovery equipment 10 are not exposed to vapors containing hazardous or noxious levels of HF. Moreover, obtaining a higher delivered HF concentration would require the use of more than four scrubbers to reduce the amount of HF lost at the output of the final scrubber/concentrator.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A method for producing an aqueous solution of hydrofluoric acid by scrubbing fluorine values from a hot gaseous mixture produced during the defluorination of phosphate rock, the method comprising the steps of:
   a) withdrawing the hot gaseous mixture from a defluorination kiln;
   b) cooling the hot gaseous mixture by passing it through a heat exchanger;
   c) conveying the cooled gaseous mixture to a first scrubber adjacent the heat exchanger and thence sequentially through a plurality of series-connected scrubbers comprising at least the first scrubber and a last scrubber, and conveying the scrubbed gaseous mixture from the last scrubber to an exhaust means;
   d) absorbing a respective portion of the fluorine values within each scrubber by:
      d1) pumping a liquid from a respective sump portion of that scrubber through a respective plurality of spray heads into the gas mixture;
      d2) capturing a respective fraction of the sprayed liquid in a respective porous polymeric pad adjacent a respective upper end of that scrubber and causing the captured sprayed liquid to flow into the respective sump portion;
      d3) pumping a respective portion of the liquid from the respective sump portion to a respective liquid outlet;
   e) withdrawing, from the respective liquid outlet of each scrubber, a predetermined quantity of liquid, and conveying the predetermined quantity of liquid withdrawn from the liquid outlet of the first scrubber into a storage tank as the aqueous solution of hydrofluoric acid;
   f) replacing the predetermined quantity of liquid in each respective sump, except for that of the last scrubber, with the predetermined quantity of liquid withdrawn from the next sequential scrubber, and replacing the predetermined quantity of liquid in the last scrubber with the predetermined quantity of make-up water.

2. The method of claim 1 wherein the series of scrubbers comprises four scrubbers.

3. The method of claim 1 wherein the hot gaseous mixture is withdrawn from the kiln through a tube extending vertically upward at least ten feet therefrom.

4. The method of claim 1 wherein the heat exchanger comprises a gas tube boiler.

5. The method of claim 1 wherein the liquid in each of the sumps is maintained at a substantially constant level.

6. Apparatus for producing an aqueous solution of hydrofluoric acid from a hot gaseous mixture produced during the defluorination of phosphate rock in a kiln having an infeed end, the apparatus comprising:
   a flue having an inlet end and an outlet end, the inlet end operatively connected to the kiln adjacent the infeed end thereof;
   a heat exchanger having a hot gas inlet connected to the outlet end of the flue, the heat exchanger further having a cooled gas outlet,
   a plurality of series-connected scrubbers comprising at least a first scrubber proximal to the heat exchanger and a last scrubber, the first scrubber adapted to receive cooled gas from the heat exchanger, each of the scrubbers comprising:
      respective cooled gas inlet,
      a respective scrubbed gas outlet disposed adjacent an upper end of the respective scrubber;
      a respective porous polymeric pad disposed below the respective scrubbed gas outlet,
      a respective plurality of sprayers adapted to be fed from a respective first outlet of a respective pump having a respective liquid inlet from a respective sump, the respective pump also having a respective second outlet for removing liquid from the respective sump; and
      a respective inlet valve responsive to a level of liquid in the respective sump, each respective inlet valve adapted to open when the level of liquid in the respective sump falls below a predetermined value, each respective inlet valve, when open, allowing liquid to flow into the respective sump from a respective liquid source external to the respective scrubber;
   wherein the respective liquid source associated with the last scrubber comprises a source of makeup water, wherein the respective liquid source for all the other scrubbers comprises the respective second outlet associated with the next scrubber in the series thereof, and where the second outlet associated with the first scrubber is connected to a storage tank adapted to receive the hydrogen fluoride solution.

7. The apparatus of claim 6 wherein the scrubber comprises a polymeric coating on an inside thereof.

8. The apparatus of claim 6 wherein the plurality of scrubbers comprises four scrubbers.

9. The apparatus of claim 6 wherein the heat exchanger comprises a gas tube boiler.

10. The apparatus of claim 6 wherein the inlet end of the flue is attached to an upper end of an infeed chamber operatively associated with the kiln and wherein the flue extends upwardly fifteen feet or more therefrom.

* * * * *